(12) United States Patent
Boyd et al.

(10) Patent No.: US 10,459,461 B2
(45) Date of Patent: Oct. 29, 2019

(54) MOBILE ZIPPER UNIT

(71) Applicant: COMMANDO PRESSURE CONTROL LLC, Kingwood, TX (US)

(72) Inventors: Joseph Mark Boyd, Houston, TX (US); Richard Allen Thibodeaux, Kingwood, TX (US)

(73) Assignee: COMMANDO PRESSURE CONTROL LLC, Kingwood, TX (US)

( * ) Notice: Subject to any disclaimer, the term of this patent is extended or adjusted under 35 U.S.C. 154(b) by 97 days.

(21) Appl. No.: 15/336,810

(22) Filed: Oct. 28, 2016

(65) Prior Publication Data

US 2017/0123437 A1 May 4, 2017

Related U.S. Application Data

(60) Provisional application No. 62/248,028, filed on Oct. 29, 2015.

(51) Int. Cl.
| | |
|---|---|
| *F16K 11/20* | (2006.01) |
| *G05D 16/04* | (2006.01) |
| *E21B 41/00* | (2006.01) |
| *F17D 5/00* | (2006.01) |
| *G05D 7/06* | (2006.01) |
| *E21B 43/26* | (2006.01) |

(52) U.S. Cl.
CPC .............. *G05D 16/04* (2013.01); *E21B 41/00* (2013.01); *F17D 5/00* (2013.01); *G05D 7/0658* (2013.01); *E21B 43/26* (2013.01)

(58) Field of Classification Search
CPC .......... E21B 34/02; E21B 34/10; E21B 34/14; E21B 33/03; E21B 43/26; G05D 16/04; F16L 41/03
See application file for complete search history.

(56) References Cited

U.S. PATENT DOCUMENTS

| | | | | |
|---|---|---|---|---|
| 1,756,830 A | * | 4/1930 | Marshall ................... | F04F 1/18 137/236.1 |
| 3,134,395 A | * | 5/1964 | Glasgow .................. | B67D 7/78 137/315.01 |
| 4,603,887 A | * | 8/1986 | Mayfield ................. | E21B 21/02 285/298 |

(Continued)

*Primary Examiner* — Reinaldo Sanchez-Medina

(57) ABSTRACT

An apparatus to distribute pressurized fluid from one or more sources to multiple wellbores. The apparatus includes a manifold having at least two inlets and at least two outlets. Pressurized fluid is brought into the manifold from opposing directions so that the fluid from one inlet will impinge upon the fluid from the other inlet thereby deenergizing the fluid. Additionally, the manifold is configured such that the cross-sectional area of the inlets is less than the cross-sectional area of the manifold thereby decreasing velocity minimizing the kinetic energy available to erode or otherwise damage equipment, while providing a pressure decrease as the fluid enters the manifold. The outlets are configured such that the cross-sectional area of the outlets providing fluid to a single wellbore is greater than or equal to the cross-sectional area of the inlets such that no pressure increase occurs within the manifold or the outlets as the fluid exits the manifold. Additional velocity reduction enhancements may include angled or camp third turns between the inlet and the manifold or the manifold and an outlet.

19 Claims, 7 Drawing Sheets

(56) References Cited

U.S. PATENT DOCUMENTS

| | | | | |
|---|---|---|---|---|
| 6,698,915 B2* | 3/2004 | Dearing | ............... | E21B 21/062 |
| | | | | 137/597 |
| 6,899,172 B2* | 5/2005 | McLeod | ............... | E21B 33/068 |
| | | | | 166/90.1 |
| 9,605,525 B2* | 3/2017 | Kajaria | ............... | E21B 43/26 |
| 2008/0083530 A1* | 4/2008 | Boyd | ............... | E21B 33/068 |
| | | | | 166/90.1 |
| 2010/0032031 A1* | 2/2010 | Neal | ............... | E21B 21/02 |
| | | | | 137/565.01 |
| 2011/0048695 A1* | 3/2011 | Cherewyk | ............... | E21B 21/062 |
| | | | | 166/90.1 |
| 2012/0181046 A1* | 7/2012 | Kajaria | ............... | E21B 43/16 |
| | | | | 166/380 |
| 2013/0175038 A1* | 7/2013 | Conrad | ............... | E21B 43/26 |
| | | | | 166/308.1 |
| 2013/0284455 A1* | 10/2013 | Kajaria | ............... | E21B 43/26 |
| | | | | 166/379 |
| 2017/0198548 A1* | 7/2017 | Dickinson | ............... | E21B 43/26 |
| 2018/0223640 A1* | 8/2018 | Keihany | ............... | E21B 43/26 |

* cited by examiner

MOBILE ZIPPER UNIT

CROSS-REFERENCE TO RELATED APPLICATIONS

This application claims priority to U.S. Provisional Patent Application No. 62/248,028 that was filed on Oct. 29, 2015.

BACKGROUND

During the hydraulic fracturing or completion of a wellbore that provides access to subterranean, high pressure pumps, a wellhead assembly and various other types of equipment are installed at the wellbore site to enable safe and efficient stimulation operations to allow for the extraction of hydrocarbons and fluids from subterranean formations.

The wellhead assembly provides access to the subterranean formation and has various pressure containing components, various casing strings, casing valves, and fluid conduits. During stimulation operations, the wellhead assembly will have a frac stack/tree, which has a series of large bore valves that provide full access to the tubular casing that traverses a subterranean formation.

Hydraulic fracturing of subterranean formations requires high volumes of fracturing fluids to be pumped to the subterranean formations at high velocities and pressures to fracture the subterranean formation. With emergence of pad drilling, where more than one well exists at a single location providing multiple subterranean access points, a method of operations often referred to as simultaneous operations or zipper frac operations, is used to enhance efficiencies by reducing time and costs to complete each well on a multi-well pad. Simultaneous operations allow for stimulation operations to proceed on one subterranean formation point, while preparing an adjacent subterranean formation(s) for stimulation by running a series of wireline tools to the subterranean formation point where the stimulations operations will proceed after the prior subterranean formation is stimulated completely.

An apparatus can be used in simultaneous operations that allows for fluid(s) and pressure to be directed to the appropriate subterranean formation while isolating fluid(s) and pressure access to another subterranean formation(s). This apparatus is commonly referred to as a zipper manifold. During pumping operations, the zipper manifold is used to contain pressure and direct the fluid to the appropriate well, while isolating the wells that are not being fractured. The zipper manifold opens/closes a series of valves depending on which well(s) need to be isolated and which well needs the frac fluid directed to it.

Fluid(s) at a predetermined pressure is pumped into the manifold. A series of open valves direct fluid(s) and pressure to a subterranean formation, while all other valves on the manifold are closed to isolate adjacent subterranean formation(s) from exposure to fluid(s) and pressure. The operations of opening and closing a series of valves to direct and isolate pressure is conducted many times until all subterranean formation points have been stimulated.

The fluid mixture, volume, velocity and pressure required to fracture subterranean formations is variable depending on the composition of the formation. The combinations of these variables at the subterranean formations dictate the requirements of the horsepower and pumping capacity at the surface. The differential of pressure requirements at the subterranean formation and the requirements at the surface is a result of the fluids undergoing friction loss from the fluids' drag on the inside surface of the pipe, and from obstructions in the fluids' flow path. Obstructions are anything that changes the fluids' velocity and/or direction such as restrictions in the fluids' path, and can occur anywhere in the flow path.

Many difficulties exist when using a zipper manifold to conduct simultaneous operations, such as friction loss from the inner diameter reduction inside the flow path of the zipper manifold. The choking-down of incoming fluid into the manifold increases the pressure needed to overcome the restriction, increases the fluids' velocity, and creates turbulence in the fluids' velocities. In many instances the fluids are transporting proppant which has an abrasive effect on the equipment. The abrasive effect of the proppant is increased exponentially as a result of increased velocity in the equipment, such as when there is a restriction in the fluid flow as the fluid enters the zipper manifold or passes through the various valves in the zipper manifold. The effects of this dynamic are pressure build-ups, additional strain of upstream equipment, equipment damage/failure, and additional safety risks on the jobsite.

Thus, any advance which facilitates a less turbulent flow path, reduces fluid velocity, reduces fluid pressure, and minimizes the effects of friction loss when using a zipper manifold to conduct simultaneous operations would provide a competitive advantage in the industry.

SUMMARY

An embodiment of the current invention utilizes a zipper manifold having mixing blocks and multiple lines going to each well increasing the volume of frac fluid that can be pumped through it. The design preferably uses a series of plug valves in addition to at least matching or preferably exceeding the output capacity of the zipper manifold in comparison to the input capacity of the zipper manifold so that the velocity of the fluid through the output valves of the zipper manifold is decreased thereby allowing a net increase in the total fluid throughput, decrease friction loss, decrease turbulent flow, decrease the strain on frac pumps, and decreasing the wear on the zipper manifold and valves as compared to a similar throughput on previous zipper valves.

The mixing block allows for frac lines to connect at multiple points to facilitate fluid entering the chamber from different directions such as when multiple pumping units are being utilized. The design forces a first portion of the incoming fluid to interact with at least a second portion of the incoming fluid, wherein at least a first fluid stream and at least a second fluid stream are directed substantially towards each other such that as the at least first fluid stream and the at least second fluid stream are brought into contact with one another, both the at least first fluid stream and the at least second fluid stream lose enough energy or are de-energized. By deenergizing the fluid or reducing the velocity of the fluid damage to the internal portions of the manifold due to particulates entrained within the fluid is minimized. Directing the at least first fluid stream towards the second fluid stream causes each fluid stream to act as a buffer for the internal components of the manifold, again preventing damage to the internal portions of the manifold due to entrained particulates within the high velocity fluid.

Current zipper manifolds typically are delivered to the well site in pieces and assembled at the well site. Typically, such assembly is required due to the size of the outlet valve. By utilizing multiple yet smaller outlet valves where the combined cross-sectional area of the outlet valves is larger than the combined cross-sectional area of the inlet valves, the outlet valves may be pre-mounted onto the manifold and the manifold may then be incorporated into a single skid. In certain instances, multiple skids may be connected in series providing connections to additional wells.

One embodiment of the zipper manifold has a mixing block. The mixing block has a buffer chamber, a chamber cross-sectional area, a first inlet, a second inlet, a first outlet, and at least a second outlet. The first inlet has a first cross-sectional area and a second inlet has a second cross-sectional area wherein a first cumulative cross-sectional area of the first cross-sectional area and the second cross-sectional area is less than the chamber cross-sectional area. The first outlet has a third cross-sectional area and the at least second outlet has a fourth cross-sectional area wherein a second cumulative cross-sectional area of the outlets is greater than or equal to the cumulative cross-sectional area of the first and second cross-sectional areas. A first fluid stream enters the buffer chamber through the first inlet, a second fluid stream enters the buffer chamber through the second inlet wherein the first fluid stream impinges upon the second fluid stream in a substantially opposing direction. The first fluid stream or the second fluid stream enters the buffer chamber through a flow adapter. The first and second fluid streams have a laminar flow upon entering the buffer chamber. The first outlet and the at least second outlet are chamfered between the junction of the buffer chamber and the outlet. The first outlet and the at least second outlet have at least one removable barrier. The removable barrier is a valve. The removable barrier is remotely actuated. In another embodiment of the zipper manifold the zipper manifold has at least two mixing blocks. In turn the mixing blocks are coupled to form a buffer chamber assembly. The buffer chamber assembly has a first inlet and a second inlet where a first fluid stream and a second fluid stream enter the buffer chamber assembly in substantially opposing directions. Each mixing block has a first outlet and at least a second outlet. The buffer chamber assembly provides access to a first wellbore and at least a second wellbore, where a cumulative cross-sectional area of the outlets connected to the wellbores is greater than the cumulative cross-sectional area of the inlets. The first fluid stream enters the first inlet through a first flow adapter and the second fluid stream enters the second inlet through a second flow adapter. The first fluid stream and the second fluid stream enter the buffer chamber assembly in substantially opposing directions. The first and second fluid streams have a laminar flow upon entering the buffer chamber assembly. The first outlet and the at least second outlet have at least one removable barrier. The removable barrier is a valve. The removable barrier is remotely actuated. The buffer chamber assembly is mounted on a single skid.

A method of distributing fluid to a series of wellbores includes pumping a fluid into a mixing block. The mixing block has at least two inlets. Fluid is forced to enter the mixing block through the at least two inlets in substantially opposing directions. Prior to entering the mixing block the fluid has a first pressure and after entering the mixing block the fluid has a second lower pressure. The mixing block selectively distributes fluid from the mixing block to at least two wells. In order to reduce weight from a single massive valve, each well is connected to the mixing block by at least two fluid conduits where each fluid conduit has a valve. The valves are remotely actuated.

BRIEF DESCRIPTION OF THE DRAWINGS

The features and advantages of certain embodiments will be more readily appreciated when considered in conjunction with the accompanying figures. For a detailed description of the exemplary embodiments, reference will now be made to the accompanying drawings.

DETAILED DESCRIPTION

The description that follows includes exemplary apparatus, methods, techniques, or instruction sequences that embody techniques of the inventive subject matter. However, it is understood that the described embodiments may be practiced without these specific details.

Figure 1:
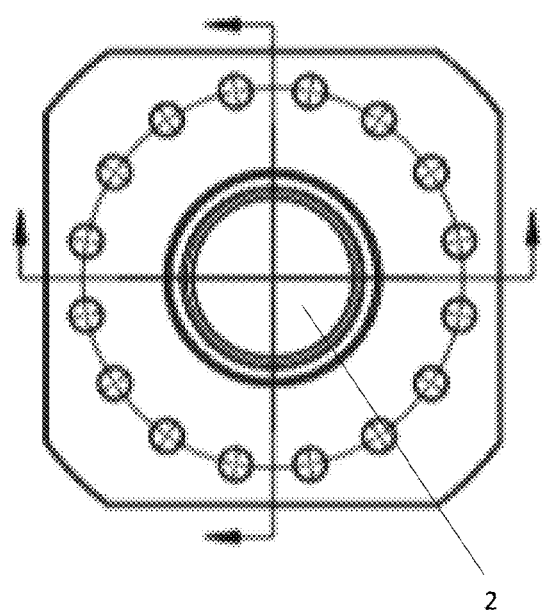
FIG. 1 depicts an end on view of a mixing block.
Figure 2:
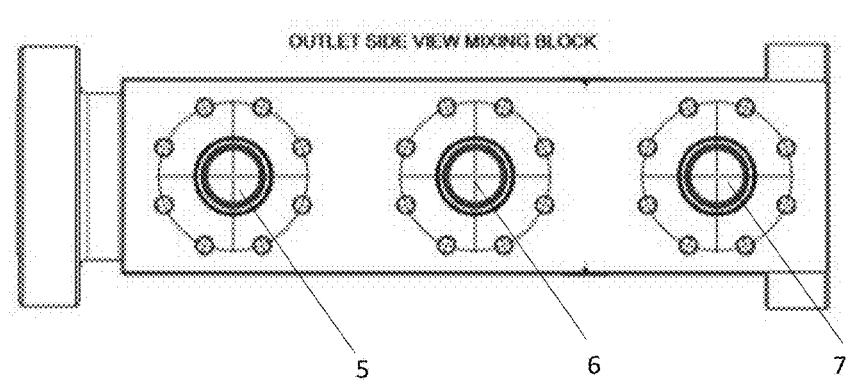
FIG. 2 depicts a side view of the mixing block.
Figure 3:
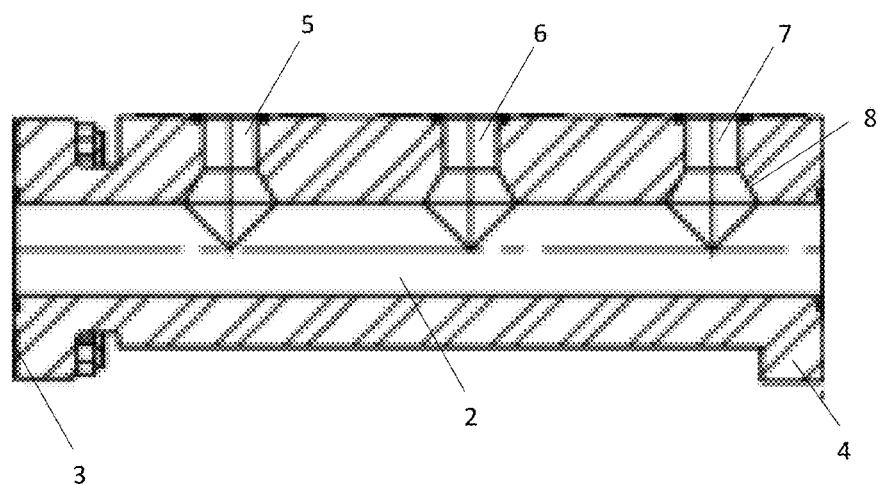
FIG. 3 depicts a top view of the mixing block.

FIGS. 1, 2, and 3 depict an embodiment of a mixing block 1. The mixing block 1 has a first end 4 and a second end 3 where the first end 4 or second end 3 of the mixing block 1 may be connected to either an additional mixing block, such as in the embodiment of FIG. 4 where mixing block 30 is connected to at least mixing block 29), to a fluid flow adapter such as an injection head, such as in the embodiment of FIG. 4 where injection head 22 is connected to mixing block 30. Mixing block 1 has a mixing chamber 2 where fluid flow from the inlets, which may adjacent to the first end 4 and the second end 3, is directed. Mixing block 1 also has at least one outlet, in this instance outlets 5, 6, and 7, to allow fluid flow from the mixing chamber 2 to flow to the exterior of the mixing block 1, typically towards the desired well bore. Generally each outlet has some type of removable barrier usually a valve but it may be a cap or plate between the outlet and fluid conduit.

Figure 4:
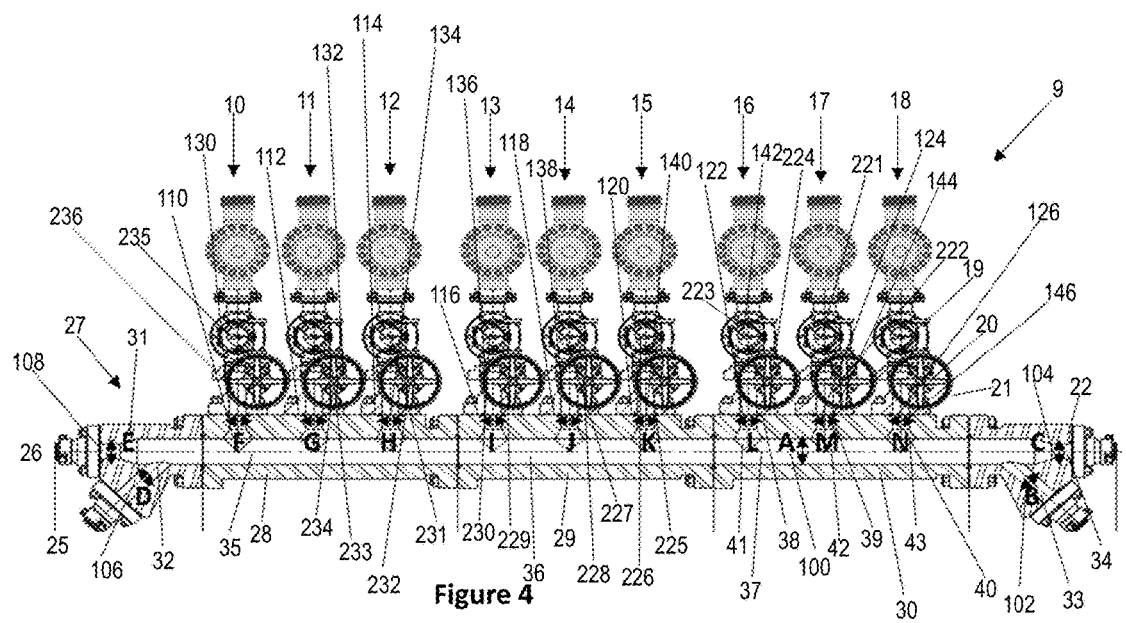
FIG. 4 depicts a mixing block assembly including outflow valves.

FIG. 4 depicts multiple mixing blocks 28, 29, and 30 connected in series. The first mixing block 30 has a buffer chamber 37. Buffer chamber 37 has a cross-sectional area A, depicted by reference numeral 100, that is at least equal to or greater than the cumulative cross-sectional areas B 102, C 104, D 106, and D 108 of inlets 23, 24, 25, and 26 or any combination thereof. Generally each inlet has some type of flow adapter where the flow adapter is connected between the pump and the inlet on the buffer chamber. The flow adapter allows the connection from a smaller diameter fluid conduit from the pump to the larger diameter of the buffer chamber. In some instances the flow adapter may be formed as a portion of a mixing block inlet.

The cumulative cross-sectional area areas B 102, C 104, D 106, and D 108 of each of the inlets 23, 24, 25, and 26 is preferably less than or equal to the cross-sectional area A 100 of the mixing chamber 2. By increasing the cross-sectional area A 100 of the mixing chamber as compared to the cumulative cross-sectional areas B 102, C 104, D 106, and D 108 of inlets 23, 24, 25, and 26 the velocity of the fluid decreases as the fluid enters the mixing chamber. The decrease in velocity reduces the kinetic energy available to erode or otherwise damage the mixing block 1. An additional benefit of increasing the cross-sectional area of the mixing chamber 2 as compared to the inlets 23, 24, 25, and 26 is a reduction in pressure buildup as the fluid moves from the inlets 23, 24, 25, and 26 into the mixing chamber 2. The reduction in pressure build up reduces wear and tear on the pumps and reduces the amount of power required to pump the frac fluid into the wellbore.

The outlets 132, 134, 136, 138, 140, 142, 144, and 146 respectively have cross-sectional areas F 110, G 112, H 114, I 116, J 118, K 120, L 122, M 124, and N 126 whereby the cumulative cross-sectional areas of the open lines leading to a wellbore such as cross-sectional area F 110, G 112, H 114, I 116, J 118, K 120, L 122, M 124, and N 126 are greater than or equal to the cumulative cross-sectional areas B 102, C 104, D 106, and D 108 of inlets 23, 24, 25, and 26 thereby preventing a velocity increase through the outlets 132, 134, 136, 138, 140, 142, 144, and 146, and any associated valves in fluid communication with the outlets 132, 134, 136, 138, 140, 142, 144, and 146. It may be desirable that the combined cross-sectional area of the exit lines from each mixing block 28, 29, or 30 be at least equal to or greater than the combined cross-sectional area of the cross-sectional area B 102, C 104, D 106, and D 108 of inlets 23, 24, 25, and 26.

The angled or chamfered joints 41, 42, and 43 allow fluid leaving the mixing chamber 37 to maintain a laminar flow as the fluid exits the mixing chamber 37. Each of the first mixing block 30, second mixing block 29, and third mixing block 28 are designed to connect the flow path to a desired frac stack positioned on the wellhead. Preferably each mixing block 28, 29, and 30 is connected to a single frac wellhead. When multiple mixing blocks are coupled together they become a zipper manifold assembly. In certain instances a single mixing block may be formed incorporating the features of multiple mixing boxes bolted together thereby becoming a zipper manifold assembly.

In many instances the mixing block 1 is designed such that fluid enters the mixing block 1 from both the first end 4 and the second end 3 thereby causing the fluid from each end to impinge upon the fluid entering from the other end. As the fluid from one end impacts the fluid from the other end the fluid is de-energized inside buffer chamber 2. Additionally, the fluid already in the mixing block 1 tends to buffer and de-energize any fluid subsequently entering the mixing block 1.

Figure 5:
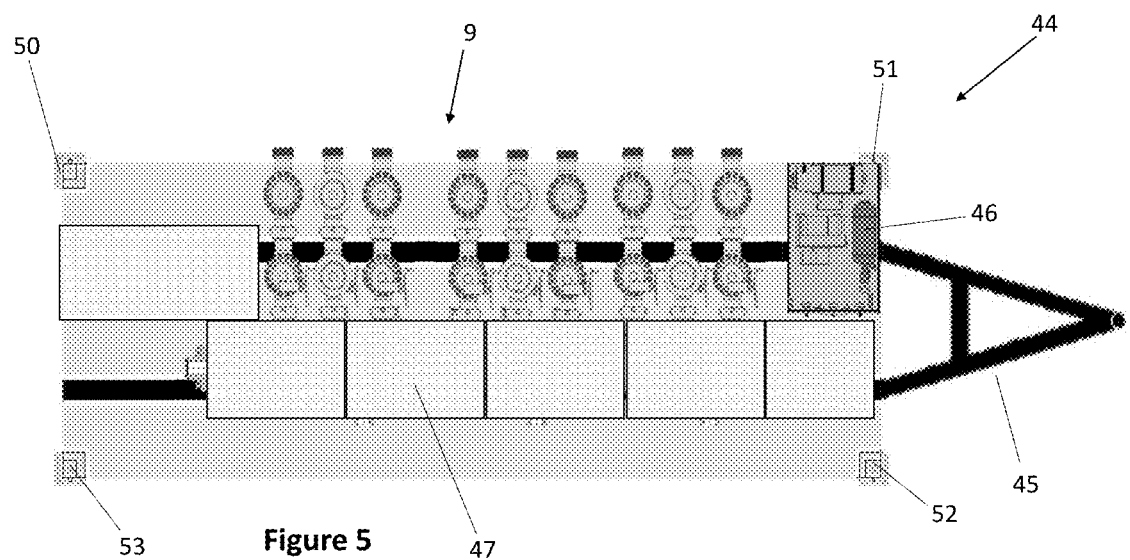
FIG. 5 depicts a top view of a trailer mounted zipper manifold.
Figure 6:
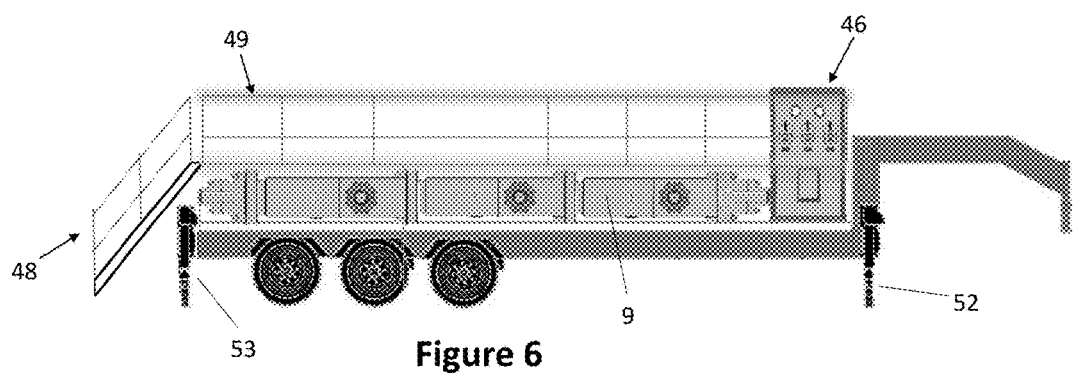
FIG. 6 depicts a side view of a trailer mounted zipper manifold.

An example of a three well zipper manifold design having a first mixing block 30, second mixing block 29, and third mixing block 28 is provided in FIG. 4 in accordance with an embodiment of the pressure containing equipment, and a mounting system of the multiple mixing block zipper manifold mounted on a mounting system 44 shown on FIG. 5. Focusing on the embodiment on FIG. 4, any combination of injection points 23, 24, 25, and/or 26, can be used to connect the flow path from the frac missile 55 in FIG. 7 to the multiple mixing block zipper manifold assembly 9. The frac missile 55 is used to connect multiple frac pumps 54 to a centralized output. The combined cross-sectional area of the combination of incoming lines 56, 57, 58, and 59 provided on FIG. 7, must not exceed the cross-sectional area of any of the mixing chambers 35, 36, and/or 37 in FIG. 4. The coupling devices for the inlets 23, 24, 25, or 26 can be threaded, studded, or any other coupling device.

Figure 7:
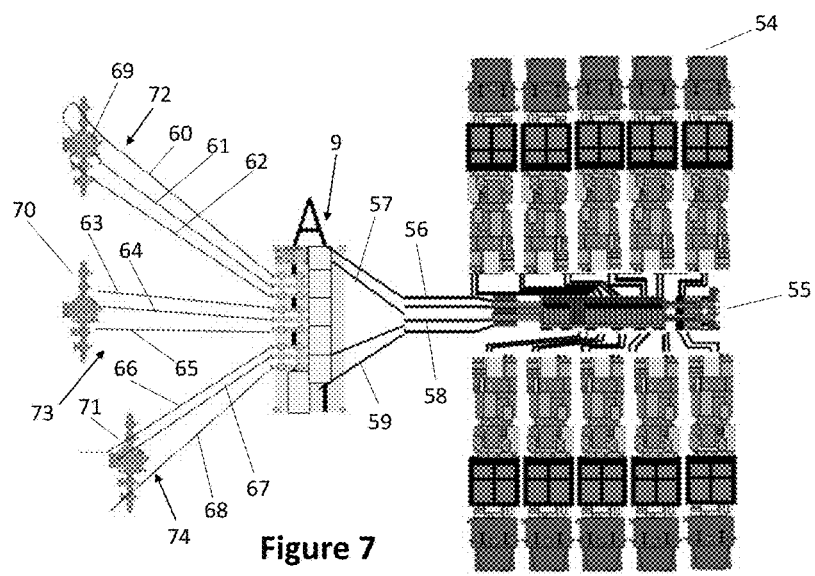
FIG. 7 depicts a fracturing assembly including multiple pump trucks delivering pressurized fluid to a zipper manifold that in turn is distributing pressurized fluid to multiple wellheads.

The multiple mixing block zipper manifold assembly 9 includes lines 60, 61, and 62 that form the flow path 72 to the wellhead 69 shown in FIG. 7. The multiple mixing block zipper manifold 9 depicts three flow paths, 72, 73, and 74 exiting from the multiple mixing block zipper manifold assembly 9 where each flow path allows fluid to flow from a mixing block, such as mixing blocks 28, 29, and 30 in FIG. 4, to the respective wellheads 69, 70, and 71 in FIG. 7. Flow path 72 includes exit lines 60, 61, and 62 and directs fluid to wellhead 69. Exit lines 63, 64, and 65 direct fluid to wellhead 70. Exit lines 66, 67, and 68 direct fluid to wellhead 71. The combined cross-sectional area of the exit lines of each flowpath must be at least equal to or greater than the combined cross-sectional area of the cross-sectional area of the inlet lines 56, 57, 58, and 59. For example, exit lines 60, 61, and/or 62 must have a combined cross-sectional area equal to or greater than the combined square area of any combination of injection lines 56, 57, 58 and/or 59 used to pumped sufficient fluid volume into the multiple mixing block zipper manifold 9 to prevent the increase of fluid velocity and pressure increase, which minimizes damage to zipper manifold 9.

In FIG. 4, each exit lines 10-18 typically has at least two valves, barriers, or any combination thereof such as valves 19 and 20 which provide a barrier between mixing block 30 and exit line 18. Depending on which wellhead 69, 70, or 71 the fluid needs to be directed to, the exit lines on each mixing block 28, 29, or 30 will allow fluid to flow through or be isolated with valves or other barrier. For example, if the desired fluid path is directed to wellhead 69, the valves 19, 20, 221, 222, 223, and 224 are open or barriers are removed between mixing block 30 and exit lines 16, 17, and 18 allowing fluid to flow from mixing block 30 through exit lines 60, 61, and 62 and into the subterranean formation that wellhead 69 provides access to. If the fluid is being directed into wellhead 69, then wellheads 70 and 71 are isolated from receiving fluid flow or pressure by closing the valves or adding barriers to exit lines 10-15 to prevent fluid from flowing through flow path 73 and/or 74.

When the desired fluid flow path is directed to wellhead 70, the valves/barriers on exit lines 13, 14, and 15 are opened/removed to allow the flow path to exit the multiple mixing block zipper manifold 9, through exit flow lines 63, 64, and/or 65 and flow into the subterranean formation through access provided by wellhead 70. When fluid is directed to wellhead 70, wellheads 69 and/or 71 are isolated from receiving fluid flow or pressure by closing the valves or adding barriers to exit lines 10, 11, 12, 16, 17, and/or 18 in the multiple mixing block zipper manifold 9 to prevent flow and pressure on wellheads 69 and 71.

When the desired fluid flow path is directed to wellhead 71, the valves/barriers on exit lines 10, 11, and/or 12 are opened/removed to allow the flow path to exit the multiple mixing block zipper manifold 9, flow through the flow path lines 74 that couple the fluid path from the multiple mixing block zipper manifold 9 to the subterranean formation provided by wellhead 71. When fluid is directed to wellhead 71, wellheads 69 and/or 70 are isolated from receiving fluid flow or pressure by closing the valves or adding barriers to exit lines 13-18 in the multiple mixing block zipper manifold 9 to prevent flow and pressure on wellheads 69 and/or 70

An example in accordance with the mounting system 44 is presented in FIG. 5. The entire multiple mixing block zipper manifold 9 is mounted to a skid or trailer 45 to allow for transportation to and from the job site, and is used to support the multiple mixing block zipper manifold 9 during operations. In certain instances, the barriers or valves 19, 20, 221, 222, 223, 224, 225, 226, 227, 228, 229, 230, 231, 232, 233, and 234 connected between the mixing blocks 28, 29, and 30 to the exit lines 10, 11, 12, 13, 14, 15, 16, 17, and/or 18 can be operated manually, electrically, pneumatically, hydraulically, or any other known means. Preferably the valves 19, 20, 221, 222, 223, 224, 225, 226, 227, 228, 229, 230, 231, 232, 233, and 234 are powered by hydraulic closing unit 29 that is used to open or closed the hydraulic valves. The power unit 29 can be left on the trailer 31 during operations or might be removed from the trailer 31 depending on customer preference. The mounting system 31 has integrated plumbing that runs between the hydraulic closing unit 46 to the valves/barriers 19, 20, 221, 222, 223, 224, 225, 226, 227, 228, 229, 230, 231, 232, 233, and 234 of each exit line 10, 11, 12, 13, 14, 15, 16, 17, and/or 18. The plumbing system of the mounting system 44 is designed to eliminate the plumbing from being a trip or fall hazards, while also position in way that provides access to the plumbing.

The mounting system is built with a mezzanine working deck 47 that allows a clear walking space to access the valves and associated equipment on the multiple mixing block zipper manifold 9. The panels of the mezzanine working deck 47 are removable to provide access to equipment and coupling points of the multiple mixing block zipper manifold 9 position under or around the mezzanine working deck 47. The mezzanine working deck is accessible by a stairway 48 that runs from the ground level up to the mezzanine working deck 47 level. Both the stairway 48 and mezzanine working deck 47 have safety support railings 49 that allow for safe operations on the mounting system 44.

The mounting system 45 in FIG. 5 is structurally engineered to support the multiple mixing block zipper manifold 9 and the associated equipment during transit and operations.

The mounting system has a series of support legs or stands 50, 51, 52, and 53 that can be deployed to add stability to the mounting system 44 during operations and retracted when the mounting system 44 is in transit. As seen in an example of a job site in FIG. 7, the mounting system of the manifold 44 is transported to location and set on the job site in accordance to customer instructions. The support legs 50-53 on the mounting system 45 are deployed after the unit 44 is set in its desired location. Incoming fluid conduits 56, 57, 58, and/or 59 are coupled to the appropriate injection points 23, 24, 25, and/or 26 shown in FIG. 4 to make a flow path for fluid and pressure to enter the buffer chambers 28, 29, and 30 in FIG. 2. The fluid flow and pressure are generated upstream of the mounting system 44 by pump trucks 54 that pump the fluid(s) to the frac missile 55 and then through the incoming fluid conduits 56, 57, 58, and/or 59 to connect to the multiple mixing block zipper manifold.

Next, the exiting flow conduits 60, 61, 62, 63, 64, 65, 66, 67 and/or 68 are coupled to the exit lines 10, 11, 12, 13, 14, 15, 16, 17, and/or 18 of the multiple mixing block zipper manifold 9, which provides the flow path for fluid and pressure to flow to wellheads 69, 70, and or 71. Once the flow conduits paths 72, 73, and/or 74 are coupled to wellheads 69, 70, and/or 71 via the exit flow lines 60, 61, 62, 63, 64, 65, 66, 67 and/or 68 to the multiple mixing block zipper manifold 9, in turn fluidly connected to the frac missile 55 and thereby to the pump trucks 54, fluid access is provided, as desired, to the formations. Once operations commence, a series of valves/barriers will be opened/closed to direct fluid to the appropriate wellhead and isolate fluid and pressure from the adjacent wellhead(s) as described previously.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A zipper manifold comprising: a mixing block having a buffer chamber, a chamber cross-sectional area a first inlet, a second inlet, a first outlet, and a second outlet, the first inlet being positioned on a proximal end of the mixing block, the second inlet being positioned on a distal end of the mixing block, the buffer chamber being positioned between the first inlet and the second inlet the first outlet and the second outlet being positioned on a first sidewall of the buffer chamber between the first inlet and the second inlet, the first inlet and the second inlet being open inlets, the mixing bock being positioned between the wellhead and the frac missile; wherein the first inlet has a first cross-sectional area and a second inlet has a second cross-sectional area, the first inlet and the second inlet being fluidly coupled to the frac missile; wherein a first cumulative cross-sectional area being a summation of the first cross-sectional area and the second cross-sectional area is less than the chamber cross-sectional area; wherein the first outlet has a third cross-sectional area and the second outlet has a fourth cross-sectional area, the first outlet and the second outlet being fluidly coupled to the wellhead; wherein a second cumulative cross-sectional area being a summation of the third cross-sectional area and the fourth cross-sectional area is greater than the first cumulative cross-sectional area; a first fluid stream entering the buffer chamber through the first inlet, a second fluid stream entering the buffer chamber through the second inlet; wherein the first and second fluid streams have a laminar flow upon entering the buffer chamber, wherein the first outlet and the second outlet are fluidly connected to at least one wellbore; a second sidewall extending from the first inlet to the second inlet, the first sidewall and the second sidewall being positioned one hundred eighty degrees apart from each other, wherein the second sidewall is a continuous sidewall with no inlet between the first inlet and the second inlet.

2. The zipper manifold of claim 1, wherein the first outlet and the at least second outlet have at least one removable barrier.

3. The zipper manifold of claim 2, wherein the removable barrier is a valve.

4. The zipper manifold of claim 2, wherein the removable barrier is remotely actuated.

5. The zipper manifold of claim 1, wherein none of the plurality of outlets are positioned on the second sidewall.

6. The zipper manifold of claim 5, wherein the mixing block is a single unitary element.

7. The zipper manifold of claim 1, wherein the first inlet is fluidly connected to a first flow adapter, and the second inlet is fluidly connected to a second flow adapter.

8. The zipper manifold of claim 7, wherein a first connection between the first fluid inlet and the first flow adapter has a fifth cross-sectional area, a second connection between the second inlet and the second flow adapter has a sixth cross-sectional area.

9. The zipper manifold of claim 8, wherein a third cumulative cross-sectional area of the fifth cross-sectional area and the sixth cross-sectional area is less than or equal to the first cumulative cross-sectional area.

10. The zipper manifold of claim 9, wherein the third cumulative cross-sectional area is less than or equal to the second cumulative cross-sectional.

11. The zipper manifold of claim 1, wherein the first fluid stream or the second fluid stream enters the buffer chamber through a flow adapter.

12. The zipper manifold of claim 1, wherein the first outlet and the at least second outlet are chamfered between the junction of the buffer chamber and the first outlet and the second outlet.

13. A zipper manifold assembly comprising:
a buffer chamber assembly formed of a first mixing block and a second mixing block, the buffer chamber assembly has a first inlet and a second inlet, the first inlet being positioned on a proximal end of the first mixing block, the second inlet being positioned on a distal end of the second mixing block, the buffer chamber assembly being positioned between the first inlet and the second inlet, wherein a distal end of the first mixing block is directly coupled to a proximal end of the second mixing block, the buffer chamber assembly including a first sidewall extending from the first inlet to the second inlet, and a second sidewall extending from the first inlet to the second inlet, the first sidewall and the second sidewall being positioned one hundred eighty degrees apart from each other;
a first fluid stream and a second fluid stream have a laminar flow upon entering the buffer chamber assembly;
a first outlet and a second outlet positioned on the first mixing block, the first outlet and the at least the second outlet being positioned on the first sidewall;
a third outlet and a fourth outlet positioned on the second mixing block, the third outlet and the fourth outlet being positioned on the first sidewall, wherein the second sidewall is a continuous sidewall with no inlets between the first inlet and the second inlet.

14. The zipper manifold assembly of claim 13, wherein the first outlet and the at least the second outlet of the buffer chamber assembly provides access to a first wellbore and at least a second wellbore.

15. The zipper manifold assembly of claim 13, wherein the first fluid stream enters the first inlet through a first flow adapter and the second fluid stream enters the second inlet through a second flow adapter.

16. The zipper manifold assembly of claim 13, wherein the first outlet and the at least second outlet have at least one removable barrier.

17. The zipper manifold assembly of claim 16, wherein the removable barrier is a valve.

18. The zipper manifold assembly of claim 16, wherein the removable barrier is remotely actuated.

19. The zipper manifold of claim 13, wherein the buffer chamber assembly is mounted on a single skid, modular skids or a trailer.

* * * * *